(12) United States Patent
Hoshi et al.

(10) Patent No.: US 11,131,342 B2
(45) Date of Patent: Sep. 28, 2021

(54) MOVING BODY GUIDING DEVICE

(71) Applicant: MAKINO MILLING MACHINE CO., LTD., Tokyo (JP)

(72) Inventors: Yoshio Hoshi, Aiko-gun (JP); Kazumasa Kono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 16/647,126

(22) PCT Filed: Sep. 15, 2017

(86) PCT No.: PCT/JP2017/033575
§ 371 (c)(1),
(2) Date: Mar. 13, 2020

(87) PCT Pub. No.: WO2019/053895
PCT Pub. Date: Mar. 21, 2019

(65) Prior Publication Data
US 2021/0025449 A1  Jan. 28, 2021

(51) Int. Cl.
*F16C 33/10* (2006.01)
*F16C 29/02* (2006.01)
*F16C 32/06* (2006.01)
*B23Q 1/38* (2006.01)

(52) U.S. Cl.
CPC ............. *F16C 33/106* (2013.01); *B23Q 1/38* (2013.01); *F16C 29/02* (2013.01); *F16C 32/0651* (2013.01); *F16C 33/1085* (2013.01)

(58) Field of Classification Search
CPC ...... F16C 29/005; F16C 29/008; F16C 29/02; F16C 29/025; F16C 32/0629; F16C 32/0633; F16C 32/064; F16C 32/0648; F16C 32/0651; F16C 32/0655; F16C 32/0659; F16C 33/10; F16C 33/1025; F16C 33/106; F16C 33/1085; F16C 32/0644;
(Continued)

(56) References Cited

U.S. PATENT DOCUMENTS

| | | | | |
|---|---|---|---|---|
| 3,355,990 A | * | 12/1967 | Thum | F16C 29/025 409/219 |
| 4,865,465 A | * | 9/1989 | Sugita | B23Q 1/38 384/12 |
| 7,287,906 B2 | * | 10/2007 | Wasson | F16C 29/008 384/12 |

FOREIGN PATENT DOCUMENTS

| | | |
|---|---|---|
| JP | 61-095842 A | 5/1986 |
| JP | 62-241629 A | 10/1987 |
| JP | 2006-266287 A | 10/2006 |

(Continued)

*Primary Examiner* — James Pilkington
(74) *Attorney, Agent, or Firm* — Morrison & Foerster LLP

(57) ABSTRACT

In a moving body guiding device which supplies lubricating oil between a guiding surface of a supporting body and a sliding surface of the moving body and guides a moving body, a lubricating oil pocket having a periphery enclosed by a land portion is provided on the sliding surface of the moving body, a closed loop oil groove is formed along the inside of the land portion, a front portion and a rear portion inside the lubricating oil pocket communicate with one another by means of a lubricating oil pocket return passage at least partially opening in the oil groove, and lubricating oil that has accumulated in the rear portion, in a movement direction, concomitant with movement of the moving body, flows to the front portion in the movement direction.

6 Claims, 7 Drawing Sheets

(58) Field of Classification Search
CPC ....... F16C 33/1065; B23Q 1/38; B23Q 1/385; B23Q 11/124
See application file for complete search history.

(56) References Cited

FOREIGN PATENT DOCUMENTS

| | | |
|---|---|---|
| JP | 2007-175840 A | 7/2007 |
| JP | 2013-91142 A | 5/2013 |
| JP | 2017-160959 A | 9/2017 |
| TW | M348658 U | 1/2009 |

* cited by examiner

MOVING BODY GUIDING DEVICE

CROSS-REFERENCE TO RELATED APPLICATIONS

This application is a U.S. national phase application of International Patent Application No. PCT/JP2017/033575, filed Sep. 15, 2017, which is hereby incorporated by reference in the present disclosure in its entirety.

FIELD OF THE DISCLOSURE

The present invention relates to a moving body guiding device used in the feed axes of machine tools.

BACKGROUND OF THE DISCLOSURE

Guiding devices used in the feed axes of machine tools guide a sliding surface of a moving body on a guiding surface of a supporting body. Guiding devices are generally dynamic pressure slide-guiding systems, static pressure guiding systems, or partial load compensation slide-guiding systems, etc. The present invention relates to a moving body guide device by means of a partial load compensation slide-guiding system.

Patent Literature 1 and 2 disclose moving body guiding devices which are provided, on a sliding surface of a moving body which is guided on a guiding surface of a supporting body, with a plurality of lubricating oil pockets having peripheries which are surrounded by land portions, wherein a front portion and rear portion in the lubricating oil pockets are in communication with each other by means of a lubricating oil return line so that when the moving body moves, lubricating oil accumulated in the rear portion in the direction of movement of the moving body flows toward the front portion in the movement direction.

PATENT LITERATURE

[PTL 1] Japanese Unexamined Patent Publication (Kokai) No. 2007-175840

[PTL 2] Japanese Unexamined Patent Publication (Kokai) No. 2013-091142

SUMMARY OF THE DISCLOSURE

According to the guiding devices disclosed in Patent Literature 1 and 2, since the lubricating oil accumulated in the rear of the lubricating oil pocket flows forward in the lubricating oil pocket through the lubricating oil return line in accordance with the movement of the moving body, local increases in pressure in the lubricating oil pocket are prevented, and the amount of lubricating oil flowing out from the sliding surface is reduced.

However, in the guiding devices of Patent Literature 1 and 2, when, for example, the load on the moving body is increased, there remains a problem in that leakage of lubricating oil cannot be prevented, and thus, the technical problem to be solved by the present invention resides in the elimination of such technical drawback of the prior art and is aimed at the provision of a guiding device which can prevent or further reduce lubricating oil leakage is desired.

In order to achieve the object described above, according to the present invention, there is provided a moving body guiding device configured to supply lubricating oil between a guiding surface of a supporting body and a sliding surface of a moving body, and guide the moving body, the device comprising a lubricating oil pocket the periphery of which is enclosed by a land portion and which is provided in the sliding surface of the moving body, a plurality of recesses being formed in the sliding surface in the oil pocket, and a closed-loop oil groove being formed along the inside of the land portion, a lubricating oil return passage which is at least partially open in the oil groove of the lubricating oil pocket and which connects a front portion and a rear portion of the lubricating oil pocket so that the lubricating oil accumulated in the rear portion in the movement direction flows toward the front portion in the movement direction in accordance with movement of the moving body, and a lubricating oil supply passage which is in communication with the lubricating oil return passage and which supplies the lubricating oil pocket with the lubricating oil supplied from a lubricating oil source through the lubricating oil return passage.

According to the present invention, since a closed-loop oil groove is formed in the lubricating oil pocket along the inside of the land portion, a lubricating oil return passage which is at least partially open and which connects the front portion and the rear portion in the lubricating oil pocket is provided in the oil groove, and the lubricating oil accumulated in the rear portion in the movement direction flows through the lubricating oil return passage towards the front portion in the movement direction in accordance with the movement of the movement body, leakage of the lubricating oil in the lubricating oil pocket to the outside of the land portion is prevented.

DETAILED DESCRIPTION OF THE DISCLOSURE

Figure 1:
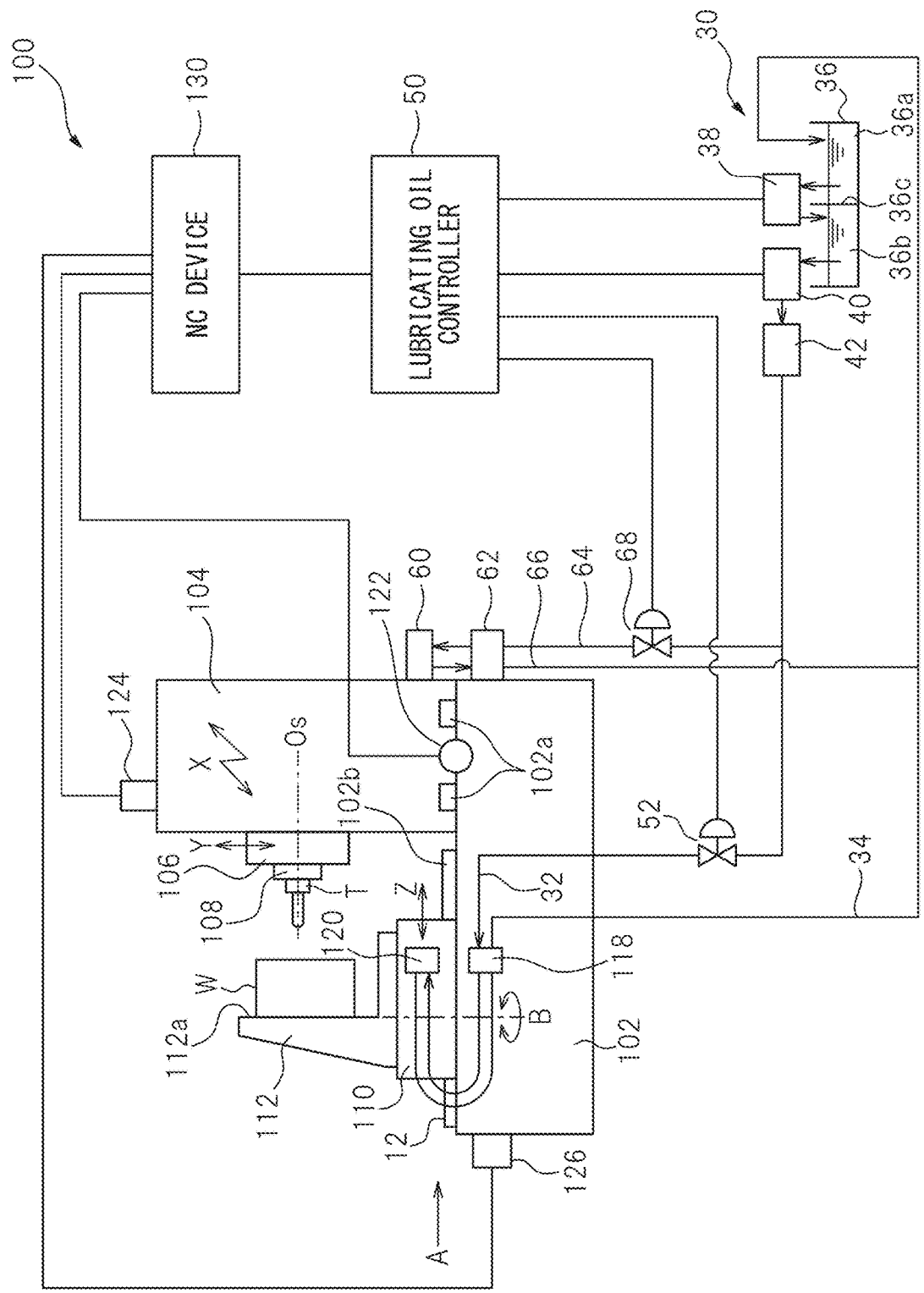
FIG. 1 is a side view of a machine tool comprising a moving body guiding device according to the present invention.
Figure 2:
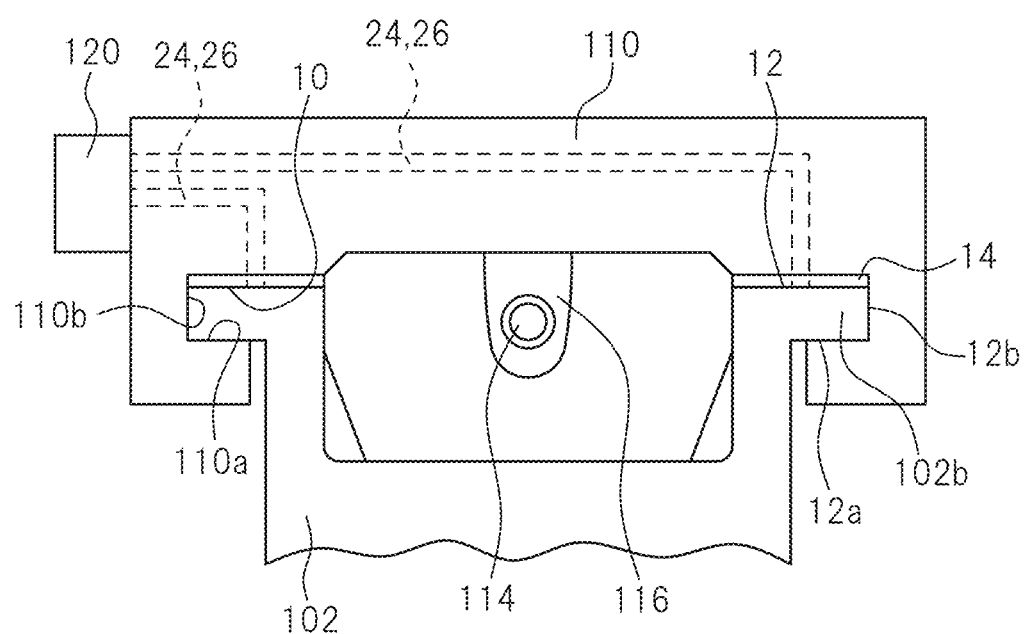
FIG. 2 is a partial front view of a machine tool from the direction of arrow A of FIG. 1.

With reference to FIGS. 1 and 2, a machine tool, in particular a vertical machining center 100, is illustrated as an example of a machine comprising a moving body guiding device according to the present invention. The machine tool 100 comprises a bed 102 serving as a supporting body affixed to the floor of a factory, and a B-axis base 110 as a moving body is attached to the upper surface of a front portion of the bed 102 so as to be movable in the forward and rearward directions (Z-axis direction) via a Z-axis feed mechanism. Furthermore, a column 104 is attached to an upper surface of a rear part of the bed 102 so as to be movable in the left and right directions (X-axis direction) via an X-axis feed mechanism. A spindle head 106 is attached to the front surface of the column 104 so as to be movable in the upward and downward directions (Y-axis direction) via a Y-axis feed mechanism, and a spindle 108 having a tip to which a tool T is attached is supported on the spindle head 106 so as to be rotatable about a horizontal axis of rotation Os.

A B-axis table (not illustrated) is supported on the B-axis base 110 so as to be rotatably fed (B-axis direction feeding) about the vertical axis. A servo motor (not illustrated) as the B-axis feed mechanism is incorporated in the B-axis base 110. A workpiece attachment member 112 such as an angle plate is attached to the upper surface of the B-axis table, and a workpiece W is attached to a workpiece attachment surface 112a of the workpiece attachment member 112.

The X-axis feed mechanism comprises an X-axis guiding device, including a pair of X-axis guide rails 102a which extend horizontally in the left and right directions on the upper surface of the bed 102 and a sliding surface formed on the bottom surface of the column 104 so as to be slidable along the X-axis guide rails 102a, and an X-axis feed device, including an X-axis ball screw (not illustrated) which extends in the X-axis direction in the bed 102, a nut (not illustrated) which is attached to the lower end portion of the column 104 and which engages with the X-axis ball screw, and an X-axis servo motor 122 which is connected with one end of the X-axis ball screw and which rotationally drives the X-axis ball screw.

Likewise, the Y-axis feed mechanism comprises a Y-axis guiding device, including a pair of Y-axis guide rails (not illustrated) which extend vertically in the column 104 and a sliding surface formed on the spindle head 106 so as to be slidable along the Y-axis guide rails, and a Y-axis feed device, including a Y-axis ball screw (not illustrated) which extends in the Y-axis direction in the column 104, a nut (not illustrated) attached inside the spindle head 106 and which engages with the Y-axis ball screw, and a Y-axis servo motor 124 which is connected to one end of the Y-axis ball screw and which rotationally drives the Y-axis drive screw.

Likewise, the Z-axis feed mechanism comprises the Z-axis guiding device provided with the guiding device according to the present invention, a Z-axis ball screw 114 (FIG. 2) which extends in the Z-axis direction in the bed 102, a nut 116 (FIG. 2) which is attached to the lower surface of the B-axis base 110 and which engages with the Z-axis ball screw 114, and a Z-axis servo motor 126 which is connected to one end of the Z-axis ball screw and which rotationally drives the Z-axis ball screw.

The X-axis servo motor 122, the Y-axis servo motor 124, the Z-axis servo motor 126, and a B-axis servo motor (not illustrated) are controlled by an NC (Numerical Control) device 130 for the machine tool 100. The NC device 130 is configured in the same manner as conventional NC devices used in the technical field of NC machine tools, and comprises a reading and interpretation unit (not illustrated) which generates operation commands by reading and interpreting an NC program, an interpolation unit (not illustrated) which generates position commands (pulse position commands) for the X-, Y-, Z-, and B-axes by performing interpolation processing on the operation commands, and a servo control unit (not illustrated) which outputs to the X-axis servo motor 122, the Y-axis servo motor 124, the Z-axis servo motor 126, and the B-axis servo motor of the machine tool 100 current values for driving the linear feed axes (X-axis, Y-axis, and Z-axis) and rotary feed axis (B-axis) based on the position commands.

The Z-axis guiding device which forms the guiding device of the present invention has a guiding surface 12 formed by a pair of Z-axis guide rails 102b which extend on an upper surface of the bed 102 horizontally in the forward and rearward directions and perpendicular to the X-axis guide rails 102a, and a sliding surface 10 which is formed on the B-axis base 110 and which contacts with and is guided by the guiding surface 12. In an actual machine tool, in order to receive the upward and downward and leftward and rightward forces applied to the B-axis base 110, the Z-axis guide rails 102b further include lower guiding surfaces 12a and side guiding surfaces 12b, and the B-axis base 110 includes sliding surfaces 110a, 110b corresponding thereto, respectively.

An embodiment of the present invention in which the guiding surface 12 serves as the guiding surface of the supporting body and the B-axis base 110 serves as the moving body will be described below.

Figure 3:
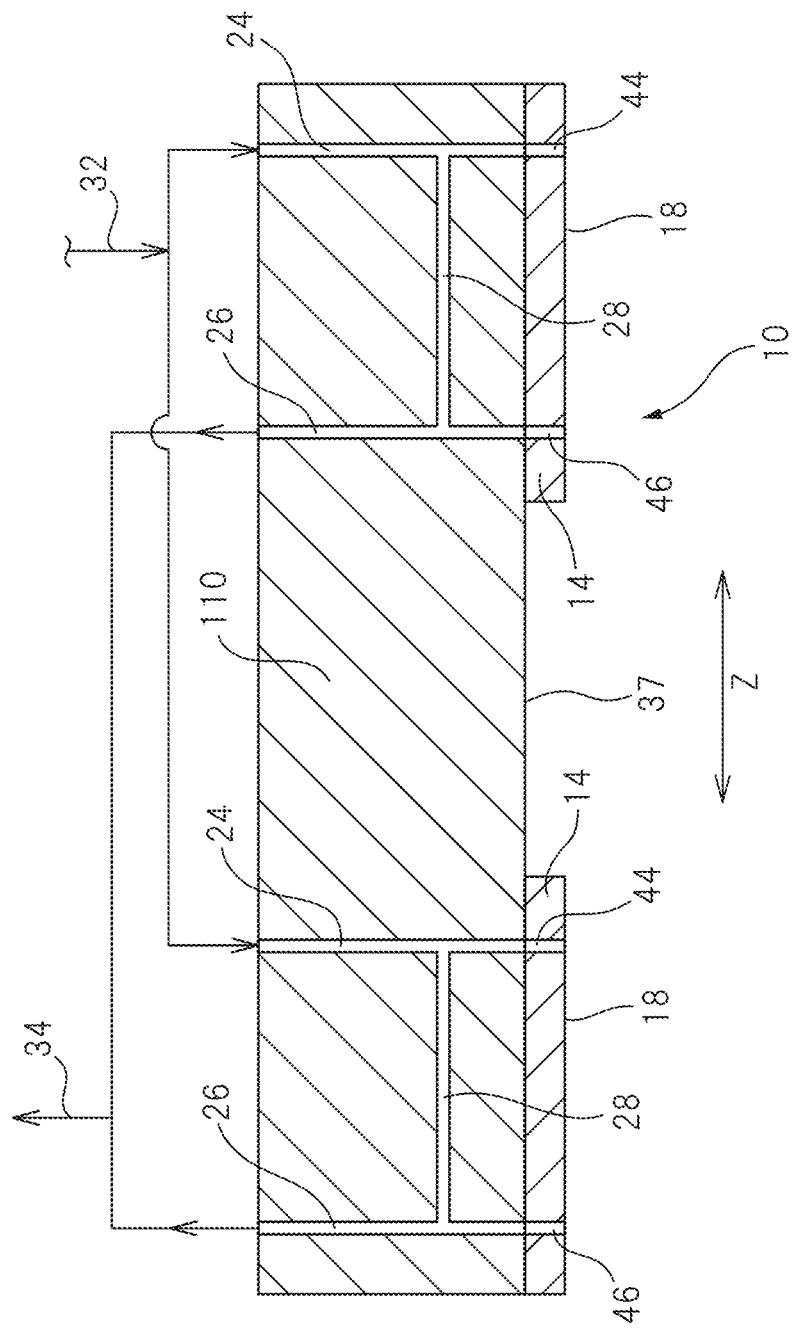
FIG. 3 is a partial cross-sectional view showing a part of a B-axis base of the machine tool of FIG. 1 serving as the moving body with the guiding device according to a preferred embodiment of the present invention.

Referring to FIG. 3, the B-axis base 110 comprises a lubricating oil return passage 28 which opens in both ends of the lubricating oil pocket 20 of the sliding surface 10 in the direction of travel, a lubricating oil supply passage 24 supplying lubricating oil from the lubricating oil source 30, through the lubricating oil return passage 28, toward the lubricating oil pocket 20, and a lubricating oil discharge passage 26 which is connected to the lubricating oil return passage 28 and which discharges the lubricating oil in the lubricating oil pocket 20 through the lubricating oil return passage 28. The lubricating oil discharge passage 26 is connected to the lubricating oil source 30. In the example shown in FIG. 3, the B-axis base 110, serving as the moving body, comprises two lubricating oil pockets 20, a lubricating oil supply line 32 is branched and is connected to the two lubricating oil supply passages 24, and a lubricating oil discharge line 34 receives the lubricating oil from the two lubricating oil discharge passages 26.

As shown in FIG. 1, the lubricating oil source 30 comprises a lubricating oil tank 36 in which lubricating oil collected from the sliding surface 10 via the lubricating oil discharge passage 26 and the lubricating oil discharge line 34 is stored, a lubricating oil temperature controller 38 which cools the lubricating oil in order to maintain a constant temperature, a pump 40 for drawing lubricating oil from the lubricating oil tank 36 and for pumping the lubricating oil into the lubricating oil supply passage 24 via the lubricating oil supply line 32, and an accumulator 42 provided on the discharge side of the pump 40 for eliminating pulsation generated in the lubricating oil by the pump 40. When using a pump with little pulsation or when the effect of pulsation is not a problem, the accumulator 42 may be omitted. The lubricating oil temperature controller 38 and the pump 40 are controlled by a lubricating oil controller 50. The lubricating oil controller 50 can be configured as, for example, a part of a machine controller (not illustrated) of the machine tool 100, and collaborates with the NC device 130.

Note that in order to connect the lubricating oil supply line 32 and the lubricating oil discharge line 34 to the B-axis base 110, which moves from the lubricating oil source 30, fittings 118, 120 (FIG. 1) are provided on the side surfaces of the bed 102 and the B-axis base 110, and the connection between the fittings 118, 120 can be protected by a cable guide or the like. A pressure control valve 52 which is controlled by the lubricating oil controller 50 can be provided in the lubricating oil supply line 32.

Furthermore, the interior space of the lubricating oil tank 36 is divided by a partition wall 36c into a receiving-side tank 36a and a supply-side tank 36b, new lubricating oil and lubricating oil from the lubricating oil discharge line 34 are stored in the receiving-side tank 36a, the lubricating oil stored in the receiving-side tank 36a is temperature-adjusted by the lubricating oil temperature controller 38 and stored in the supply-side tank 36b, and lubricating oil can be supplied from the supply-side tank 36b to the guiding device by the pump 40.

Figure 4:
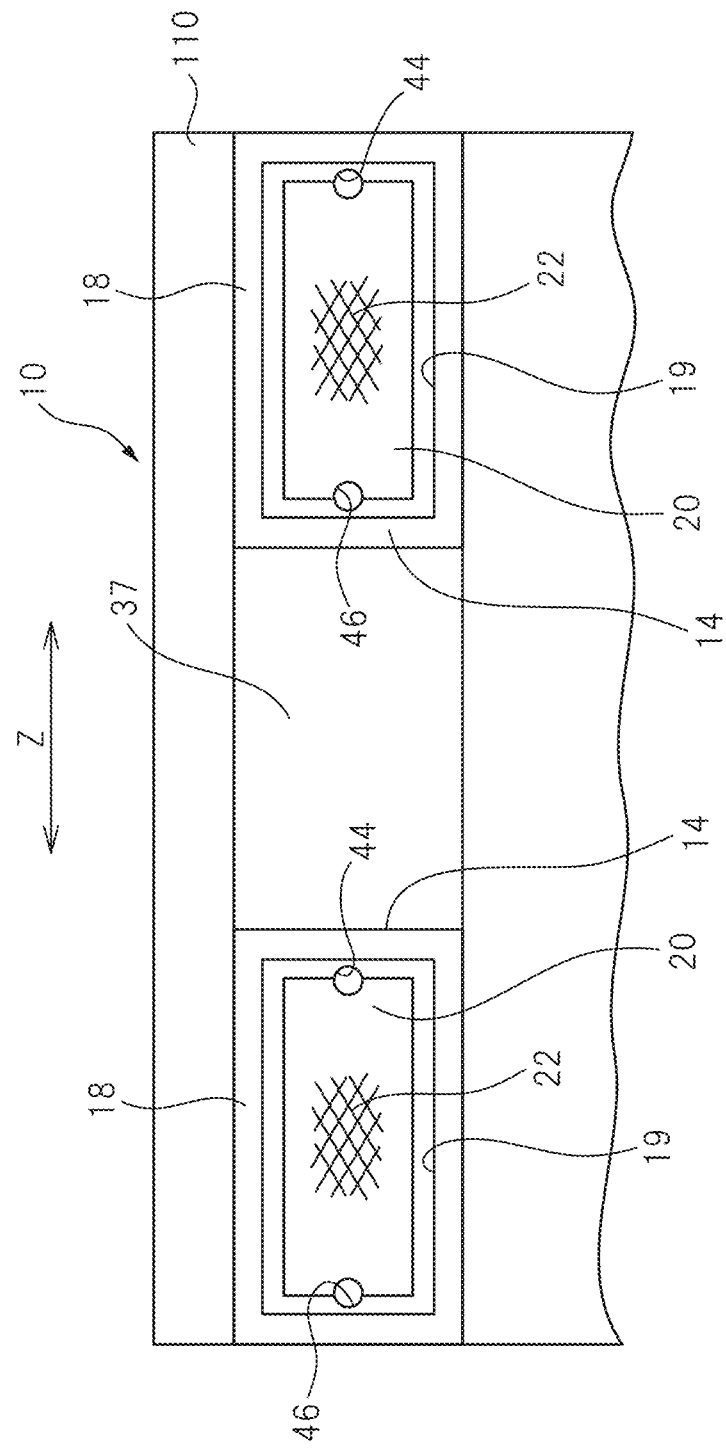
FIG. 4 is a partial plan view showing a sliding surface of the B-axis base of the machine tool of FIG. 1 serving as the moving body with the guiding device according to the preferred embodiment of the present invention.
Figure 5:
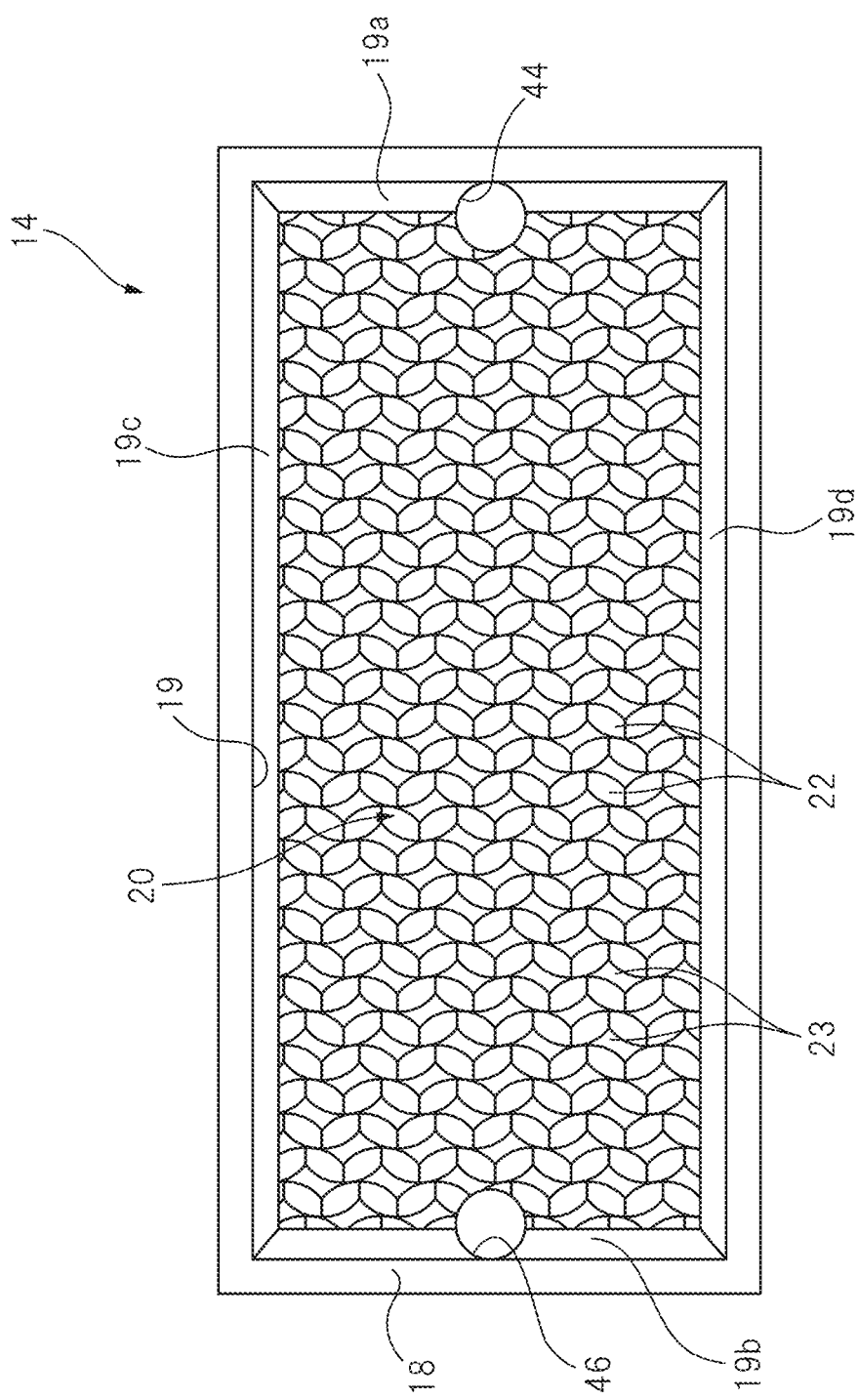
FIG. 5 is a plan view of a sliding member.

Referring to FIGS. 3 to 5, in the B-axis base 110, sliding surfaces 10 are provided on both sides of the B-axis base 110 so as to correspond to the two guiding surfaces 12 of the bed 102 as a supporting body. FIG. 4 shows the sliding surface 10 provided on one side portion of the B-axis base 110. Land portions 18 extending into rectangular shapes and having predetermined widths and lubricating oil pockets 20 surrounded by the land portions 18 are formed on the sliding surfaces 10. Closed-loop oil grooves 19, which are formed along the inner circumferences of the land portions 18, a large number of recesses 22 serving as oil reservoirs for the lubricating oil, and first and second ports 44, 46 are formed in the lubricating oil pockets 20. Note that the surface area of a surface 23 (FIG. 5) which is flush with the land portion 18 in the lubricating oil pocket 20 is preferably 15 to 50% the surface area of the interior of the land portion 18, adjacent recesses 22 are in communication with each other, and the recesses 22 adjacent to the oil groove 19 are in communication with the oil groove 19. Thus, the present embodiment, the recesses 22 are formed regularly by machining.

The oil grooves 19 preferably have smooth inner surfaces having semicircular or arc-shaped cross sections. Furthermore, the oil grooves 19 include first and second side portions 19a, 19b which extend perpendicular to the movement direction (Z-axis direction) of the B-axis base 110, and third and fourth side portions 19c, 19d which extend parallel to the movement direction (Z-axis direction) of the B-axis base 110. The first to fourth side portions 19a to 19d are in communication with each other, and the oil grooves 19 form overall rectangularly-shaped closed loops.

The first and second ports 44, 46 are arranged apart from each other in the movement direction (Z-axis direction) of the B-axis base 110, and are formed so as to be at least partially open in the first and second side portions 19a, 19b of the oil groove 19. Furthermore, the land portion 18, which surrounds the lubricating oil pocket 20, is formed approximately flush with the sliding surface 10 in the lubricating oil pocket 20, and the surface thereof is a sliding surface which directly contacts the guiding surface 12, and has substantially the same flatness as the sliding surface 10. It should be noted that the recesses 22 can be formed by scraping or the like. Each recess 22 is in communication with the recesses 22 adjacent thereto, and lubricating oil can flow from a single recess 22 to the recesses 22 adjacent thereto. Further, in order to obtain the desired flatness, the land portion 18 may be subjected to fine scraping to the extent that lubricating oil does not flow out from the sliding surface 10.

Furthermore, in the present embodiment, as shown in FIG. 4, the two land portions 18, the two lubricating oil pockets 20, the two oil grooves 19, and the two first and second ports 44, 46 are arranged apart from each other in the longitudinal direction (Z-axis direction) of the B-axis base 110 in each sliding surface 10, and a central portion therebetween serves as a flank 37. The flank 37 is appropriately provided so that the flatness of the entirety of the sliding surface 10 can be easily obtained, and so that there is no uneven friction. In a large moving body, land portions 18 and lubricating oil pockets 20 may be provided at three locations on each sliding surface 10, and flanks 37 may be provided at two locations.

Further, in the present embodiment, the land portions 18, lubricating oil pockets 20, oil grooves 19, and first and second ports 44, 46 are formed in a thin, plate-like sliding member 14 attached to the B-axis base 110. The lubricating oil return passage 28 is at least partially open in the oil grooves 19 via the first and second ports 44, 46 formed in the sliding member 14. The sliding member 14 is formed from a material having high wear resistance and a low coefficient of friction. For example, a thin plate made of a fluororesin, or, for example, bearing materials commercially available under the trade name of Turcite or Bearee can be used.

The operations of the present embodiment will be described below with reference to FIGS. 6 and 7.

Figure 6:
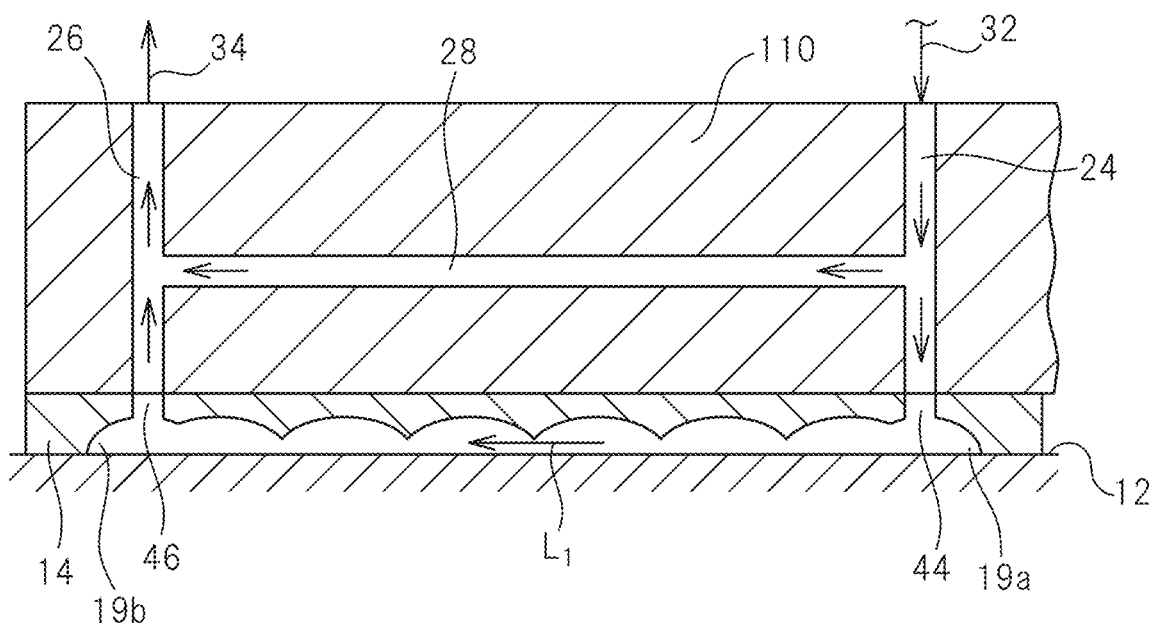
FIG. 6 is a cross-sectional view of a part of a B-axis base detailing the operations of the guiding device according to the preferred embodiment of the present invention.

When the B-axis base 110 moves to the first port 44 side of the lubricating oil return passage 28 relative to the bed 102, as indicated by arrow $Z_1$ in FIG. 6, the lubricating oil in the lubricating oil pocket 20 moves to the second port 46 side of the lubricating oil return passage 28 relative to the B-axis base 110, as indicated by arrow $L_1$. As a result, in the lubricating oil pocket 20, the second port 46 side, which is the rear side with respect to the movement direction of the B-axis base 110, becomes relatively high-pressured and the first port 44 side becomes relatively low-pressured. Thus, a portion of the low-temperature lubricating oil supplied from the lubricating oil source 30 to the lubricating oil supply passage 24 via the lubricating oil supply line 32 flows from the first port 44 and the first side portion 19a of the oil groove 19, into which the first port 44 opens, into the lubricating oil pocket 20, and the remaining portion flows into the lubricating oil return passage 28 toward the lubricating oil discharge passage 26.

The lubricating oil flowing into the lubricating oil pocket 20 flows into the lubricating oil pocket 20 toward the second port 46 side, and returns from the second port 46 and the second side portion 19b of the oil groove 19, into which the second port 46 opens, into the lubricating oil source 30 via the lubricating oil discharge passage 26 and the lubricating oil discharge line 34. When the lubricating oil flows into the lubricating oil pocket 20, the lubricating oil which was present in the lubricating oil pocket 20 and the temperature of which has been increased by the sliding is discharged from the lubricating oil pocket 20 through the second port 46 by low-temperature lubricating oil newly supplied from the first port 44. The sliding surface 10 and the guiding surface 12 are cooled by this replacement of the lubricating oil.

Figure 7:
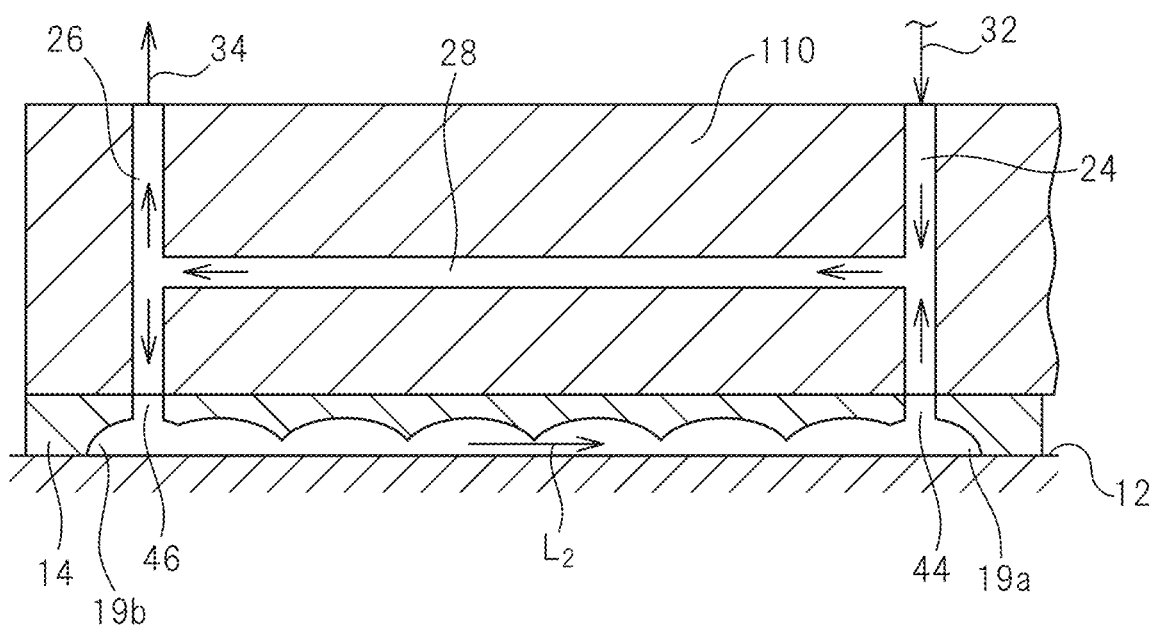
FIG. 7 is a cross-sectional view of a part of the B-axis base detailing the operations of the guiding device according to the preferred embodiment of the present invention.

When the B-axis base 110 moves to the second port 46 side of the lubricating oil return passage 28 relative to the bed 102, as indicated by arrow $Z_2$ in FIG. 7, the lubricating oil in the lubricating oil pocket 20 moves to the first port 44 side of the lubricating oil return passage 28 relative to the B-axis base 110, as indicated by arrow $L_2$. As a result, in the lubricating oil pocket 20, the first port 44 side, which is the rear side with respect to the movement direction of the B-axis base 110, becomes relatively high-pressured, and the second port 46 becomes low-pressured. Thus, the lubricating oil the temperature of which has been increased as a result of sliding in the lubricating oil pocket 20 is discharged from the first side portion 19a of the oil groove 19 and the first port 44 toward the lubricating oil supply passage 24, combines with the low-temperature lubricating oil from the lubricating oil supply passage 24, which slightly lowers the temperature thereof, and flows into the lubricating oil return passage 28. A portion of the lubricating oil flowing into the lubricating oil return passage 28 flows into the lubricating oil pocket 20 via the second port 46 and the second side portion 19b of the oil groove 19, and the remaining portion returns to the lubricating oil source 30 via the lubricating oil discharge passage 26 and the lubricating oil discharge line 34.

When lubricating oil flows into the lubricating oil pocket 20, the lubricating oil previously present in the lubricating oil pocket 20 and the temperature of which was raised, is discharged from the lubricating oil pocket 20 through the first port 44 by the lubricating oil newly supplied from the second port 46 and the second side portion 19b of the oil groove 19, the temperature of which has been somewhat decreased. The sliding surface 10 and the guiding surface 12 are cooled by this replacement of the lubricating oil.

When the B-axis base 110 moves to the first port 44 side, a greater amount of lubricating oil than when moving to the opposite direction second port 46 side is supplied from the lubricating oil source 30 to the sliding surface 10, but since the B-axis base 110 moves reciprocally in the Z-axis direction, there are no problems regarding non-uniformity of the amount of lubricating oil supplied depending on the movement direction of the B-axis base 110, and the temperature of the lubricating oil between the sliding surface 10 and the guiding surface 12 can be controlled to be substantially constant while repeating predetermined machining processes.

The first and second side portions 19a, 19b of the oil groove 19 formed in the lubricating oil pocket 20 serve to substantially expand the opening areas of the first and second ports 44, 46, and by supplying or discharging the lubricating oil over the entire width of the lubricating oil pocket 20, the lubricating oil can be quickly spread across the entirety of the lubricating oil pocket 20.

According to the present embodiment, the lubricating oil between the sliding surface 10 and the guiding surface 12 can be directly cooled, and the heated areas of the sliding surface 10 and the guiding surface 12 can be directly cooled. Furthermore, since lubricating oil is supplied to the lubricating oil pocket 20, which is surrounded by the land portion 18 formed in the sliding surface 10, the amount of lubricating oil leaking from between the sliding surface 10 and the guiding surface 12 is reduced, whereby the circulation amount of lubricating oil can be small, for example, 1000 cm3/min.

Furthermore, as described above, when the B-axis base 110, which is the moving body, moves as shown in FIGS. 6 and 7, since the first port 44 side or the second port 46 side becomes highly-pressurized in the lubricating oil pocket 20, lubricating oil leaks from both edges of the sliding surface 10 in the vicinity of the first port 44 or the second port 46. In the present embodiment, since the closed-loop oil groove 19 is formed along the inside of the land portion 18, leakage of lubricating oil from both edges of the lubricating oil pocket 20 in this manner is prevented. Specifically, since the oil groove 19 has a smooth surface which imparts little resistance to the flow of lubricating oil, lubricating oil can flow to the low-pressure side in the third and fourth side portions 19c, 19d of the oil groove 19, which extends in the movement direction of the B-axis base 110, and increases in the pressure of the lubricating oil in the portions in the rear side of the movement direction of the B-axis base 110 in the lubricating oil pocket 20 can be suppressed, whereby lubricating oil is prevented from leaking from both edges of the sliding surface 10 beyond the land portion 18.

Furthermore, during movement of the B-axis base 110, the lubricating oil controller 50 monitors the current value output from the NC device 130, in particular the servo control unit of the NC device 130, to the Z-axis servo motor 126. The current value output to the Z-axis servo motor 126 is representative of the load applied to the B-axis base 110. For example, as the weight of the workpiece W increases, the surface pressure between the guiding surface 12 and the sliding surface 10 increases, the sliding friction of the sliding surface 10 on the guiding surface 12 increases, and the current value output to the Z-axis servo motor 126 to drive the B-axis base 110 becomes large. A pressure control valve 52 which is controlled by the lubricating oil controller 50 is arranged in the lubricating oil supply line 32, and the current value output to the Z-axis servo motor 126 is monitored. When the current value exceeds a predetermined threshold value, the pressure of the lubricating oil supplied into the lubricating oil pocket 20 via the lubricating oil supply line 32 can be increased, whereby the sliding resistance of the sliding surface 10 on the guiding surface 12 can be reduced. Furthermore, when the pressure of the lubricating oil supplied into the lubricating oil pocket 20 increases, lubricating oil becomes more likely to leak from both ends of the sliding surface 10, but even in such a case, since the oil groove 19 is formed along the inside of the land portion 18 in the present invention, leakage of lubricating oil can be effectively prevented. Furthermore, the sliding resistance of the sliding surface 10 can be controlled to be constant irrespective of the change in the load acting on the moving body, so that machining accuracy can be improved and abrasion of the sliding surface 10 can be reduced.

Further, though an embodiment of the present invention in which the guiding surface 12 serves as the guiding surface of the supporting body and the B-axis base 110 serves as the moving body has been described, the present invention is not limited thereto, and the present invention can also be applied to an X-axis guiding device in which the upper surfaces of the X-axis guide rails 102a, which extend horizontally in the left and right directions on the upper surface of the bed 102, serve as the guiding surface and the column 104 serves as the moving body. In this case, as shown in FIG. 1, in order to connect the lubricating oil supply line and the lubricating oil discharge line of the column 104, which moves from the lubricating oil source 30, fittings 60, 62 can be arranged on the side surfaces of the bed 102 and the column 104, the fitting 60 can be connected to the lubricating oil supply line 32 and the lubricating oil discharge line 34 by a lubricating oil supply branch line 64 and a lubricating oil discharge branch line 66, and the connection between fittings 60 and 62 can be protected by cable guides or the like. A pressure control valve 68 which is controlled by the lubricating oil controller 50 can be provided. Even in the case in which the present invention is applied to an X-axis guiding device in this manner, it functions in the same manner as the case of the Z-axis guiding device described above. Furthermore, the present invention can be applied to an upward and downward direction Y-axis guiding device.

The aforementioned embodiment comprises the NC device 130, and in particular the servo control unit thereof, serving as a pressure detection means which detects the surface pressure exerted on the guiding surface 12 and the sliding surface 10, which are the contact surfaces between the bed 102 as the supporting body and the B-axis base 110 as the moving body, and the pressure control valve 52 or pressure control valve 68 arranged in the lubricating oil supply line 32 or the lubricating oil supply branch line 64 serving as a pressure control means for controlling the pressure of lubricating oil supplied to the lubricating oil pocket 20 based on the surface pressure detected by the pressure detection means. However, the present invention is not limited thereto.

Figure 8:
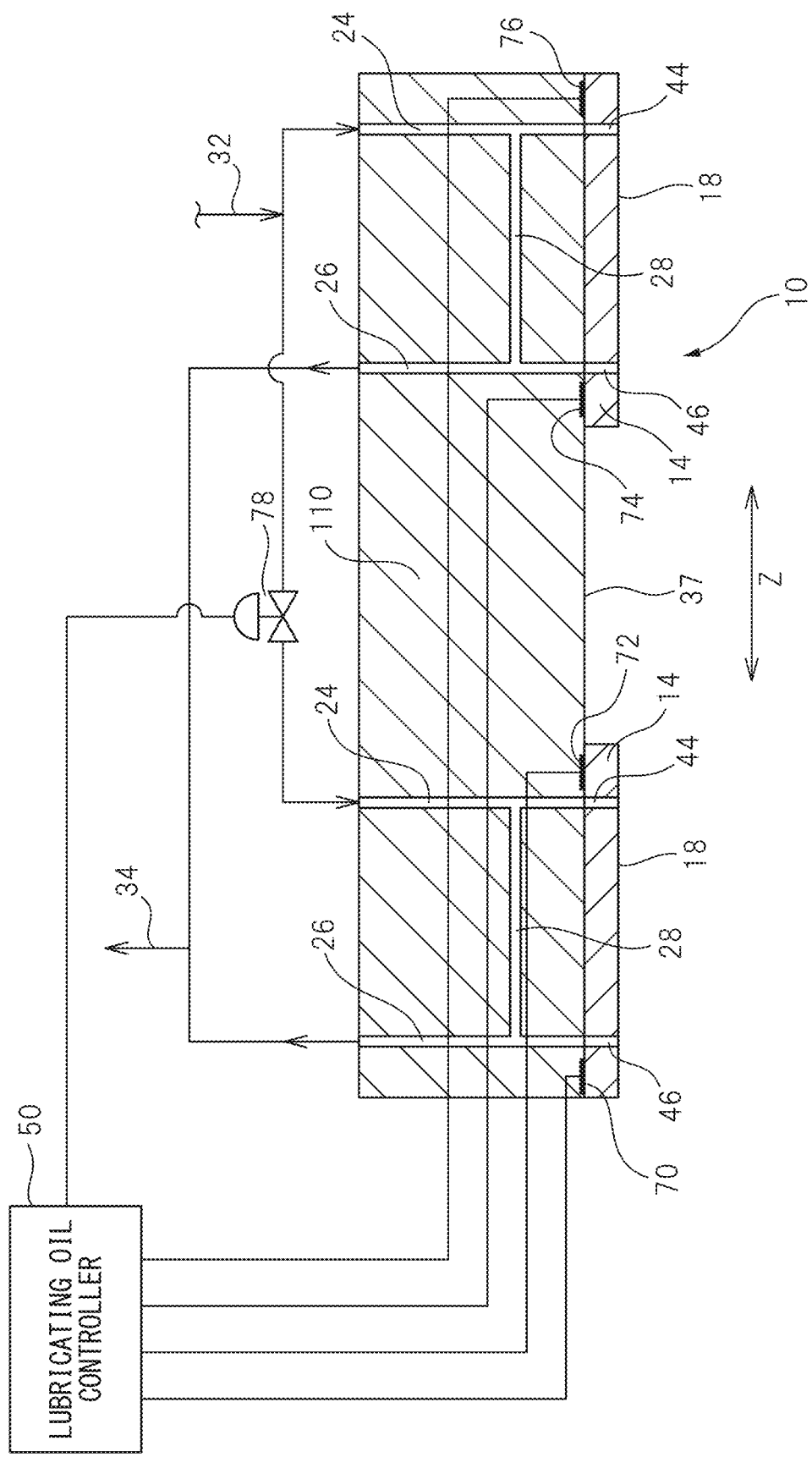
FIG. 8 is a partial cross-sectional view similar to FIG. 3 showing a portion of a B-axis base with the guiding device according to another embodiment of the present invention.

Yet another embodiment of the present invention is illustrated in FIG. 8.

In the embodiment illustrated in FIG. 8, the pressure detection means can include a sheet-like surface pressure sensor arranged between the B-axis base 110 and the sliding member 14. In particular, as shown in FIG. 8, a plurality of sliding members 14 can be affixed to the B-axis base 110, and a plurality of surface pressure sensors 70, 72, 74, 76 can be arranged between the plurality of sliding members 14 and the B-axis base 110. Furthermore, in the embodiment of FIG. 8, the pressure control means includes a pressure control valve 78 arranged in one branch of the bifurcated lubricating oil supply line 32. Furthermore, in the example of FIG. 8, the lubricating oil controller 50 averages the measurement values of the two surface pressure sensors 70, 72 arranged between one of the sliding members 14 and the B-axis base 110, compares this value with the average value of the measurement values of the two surface pressure sensor 74, 76 arranged between the other sliding members 14 and the B-axis base 110, and controls the pressure control valve 78 so that the pressure of the lubricating oil supplied to the lubricating oil pocket 20 formed by the sliding member 14 having the higher surface pressure is increased. As a result, even in the case in which, for example, the workpiece W has a shape which is elongated in the Z-axis direction and the load applied to one of the sliding members 14 is significant, the surface pressure applied to the sliding member 14 can be reduced, and the surface pressure is made uniform between the plurality of sliding members 14. Even in the case in which the load of the sliding member 14 is significant in this manner, as described above, the leakage of lubricating oil beyond the land portion 18 can be prevented. Furthermore, even if a workpiece exceeding the maximum loading weight described in the specification of the machine tool is loaded and machined, by increasing the pressure of the lubricating oil supplied to the lubricating oil pocket 20, it is possible to respond quickly without increasing the surface pressure of the sliding member 14.

Though FIG. 8 shows an example of the B-axis base 110 as the moving body, the present invention is not limited thereto, and the structure shown in FIG. 8 can be applied to the case in which the column 104 serves as the moving body. In particular, in the case of the column 104, if the spindle head 106 and the spindle 108 protrude greatly forward along the Z-axis, a large load may be exerted on the front X-axis guide rail 102a. In such a case, the pressure of lubricating oil supplied to the sliding surface supported by the guiding surface formed by the front X-axis guide rail 102a can be increased. Thus, the sliding resistance of the front and rear X-axis guide rails 102a can be made uniform.

The invention claimed is:

1. A moving body guiding device configured to supply lubricating oil between a guiding surface of a supporting body and a sliding surface of a moving body, and guide the moving body, the device comprising:
    a lubricating oil pocket provided in the sliding surface of the moving body, a periphery of the lubricating oil pocket being enclosed by a land portion, a plurality of recesses being formed in the oil pocket so as to fluidly communicate with each other, and a closed-loop oil groove being formed on the land portion so as to fluidly communicate with the recesses adjacent to the oil groove,
    a lubricating oil return passage which is at least partially open in the oil groove of the lubricating oil pocket and which connects a front portion and a rear portion of the lubricating oil pocket so that the lubricating oil accumulated in the rear portion in a movement direction flows toward the front portion in the movement direction in accordance with movement of the moving body,
    a lubricating oil supply passage which is in communication with the lubricating oil return passage and which supplies the lubricating oil pocket with the lubricating oil supplied from a lubricating oil source through the lubricating oil return passage, and
    a lubricating oil collection passage which is in communication with the lubricating oil return passage and configured to return the lubricating oil from the lubricating oil return passage to the lubricating oil source.

2. The moving body guiding device of claim 1, wherein the lubricating oil source comprises a lubricating oil tank which receives the lubricating oil from the lubricating oil collection passage, and a pump which discharges the lubrication oil from the lubricating oil tank into the lubrication oil supply passage.

3. The moving body guiding device of claim 2, further comprising a pressure sensor for detecting a surface pressure acting on contact surfaces between the supporting body and the moving body, and a pressure control valve for controlling the pressure of the lubricating oil supplied into the lubricating oil pocket based on the surface pressure detected by the pressure sensor.

4. The moving body guiding device of claim 3, wherein the pressure detection means indirectly detects the surface pressure based on electric power supplied to a servo motor which drives the moving body.

5. The moving body guiding device of claim 3, wherein the pressure control valve is arranged in the lubricating oil supply passage fluidly connected to the lubricating oil return passage.

6. The moving body guiding device of claim 1, wherein the plurality of recesses are formed so that surfaces between recesses are flush with the land portion and the surfaces collectively occupy 15 to 50% of the a total surface area enclosed by the land portion, adjacent recesses are connected to each other, and the recesses adjacent to the oil groove are connected with the oil groove.

* * * * *